L. BORSUM.
PHOTOGRAPHIC CAMERA.
APPLICATION FILED OCT. 4, 1905.

914,784.

Patented Mar. 9, 1909.
5 SHEETS—SHEET 1.

WITNESSES:
A. Kappleman
L. L. Browning

INVENTOR
Louis Borsum
BY his ATTORNEY
Edward C. Davidson

L. BORSUM.
PHOTOGRAPHIC CAMERA.
APPLICATION FILED OCT. 4, 1905.

914,784.

Patented Mar. 9, 1909.
5 SHEETS—SHEET 3.

Witnesses
A. R. Appleman
L. J. Browning

Inventor
Louis Borsum
By his Attorney
Edward C. Davidson

L. BORSUM.
PHOTOGRAPHIC CAMERA.
APPLICATION FILED OCT. 4, 1905.

914,784.

Patented Mar. 9, 1909.
5 SHEETS—SHEET 4.

WITNESSES:

INVENTOR
Louis Borsum
BY his ATTORNEY
Edward C. Davidson

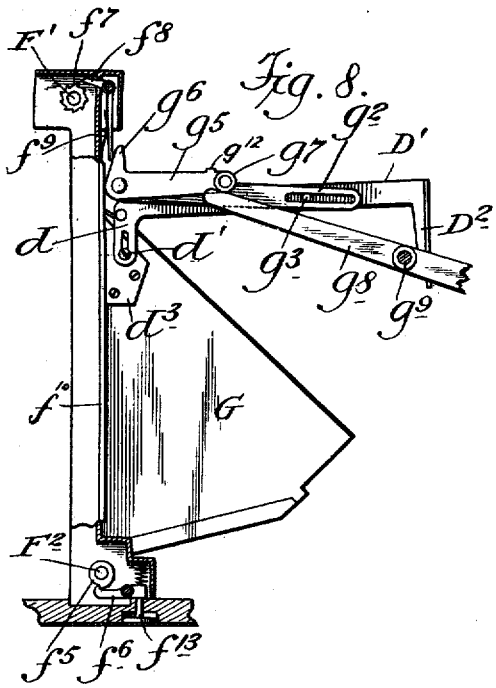
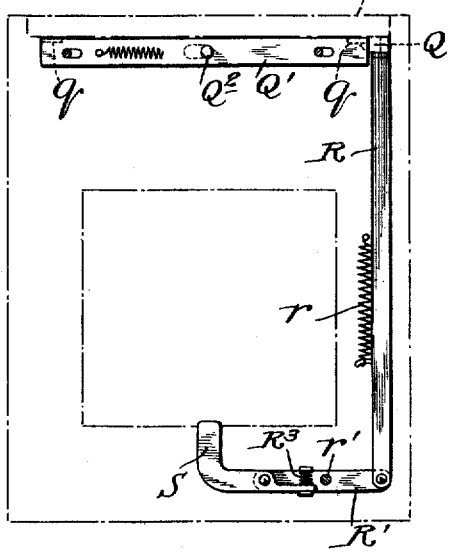
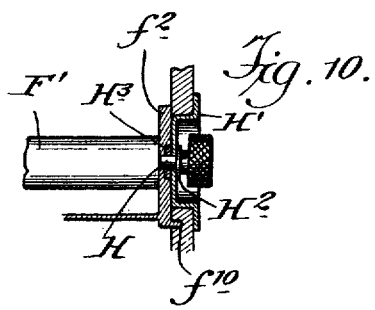
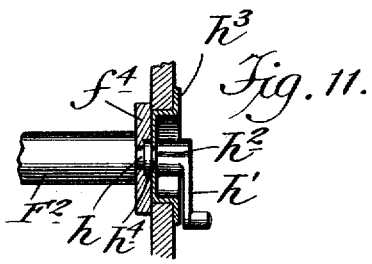

UNITED STATES PATENT OFFICE.

LOUIS BORSUM, OF PLAINFIELD, NEW JERSEY.

PHOTOGRAPHIC CAMERA.

No. 914,784.  Specification of Letters Patent.  Patented March 9, 1909.

Application filed October 4, 1905. Serial No. 281,272.

*To all whom it may concern:*

Be it known that I, LOUIS BORSUM, a citizen of the United States, residing at Plainfield, county of Union, State of New Jersey, have invented certain new and useful Improvements in Photographic Cameras, of which the following is a specification.

This invention relates primarily to that class of cameras in which the image is reflected in a mirror placed at an angle of forty-five degrees in rear of the lens and focused upon a ground glass in the top of the camera box: and consists in certain improvements hereinafter set forth in detail.

Figure 1:
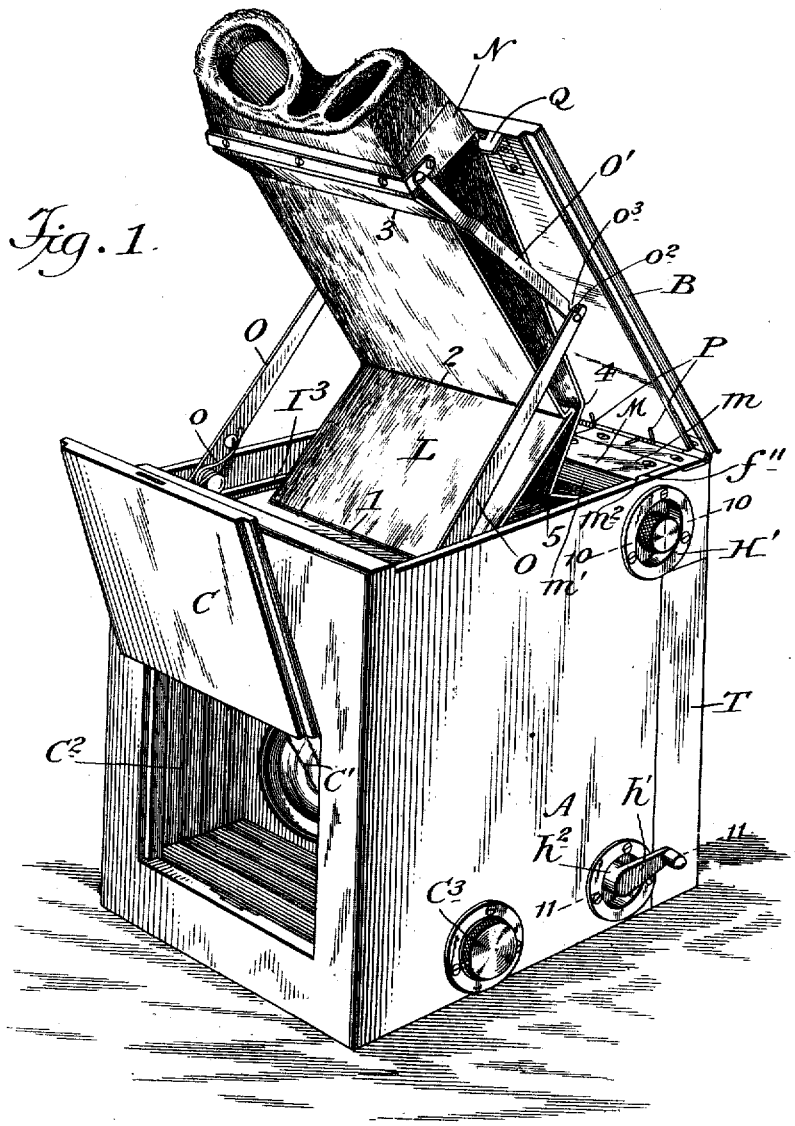
Figure 2:
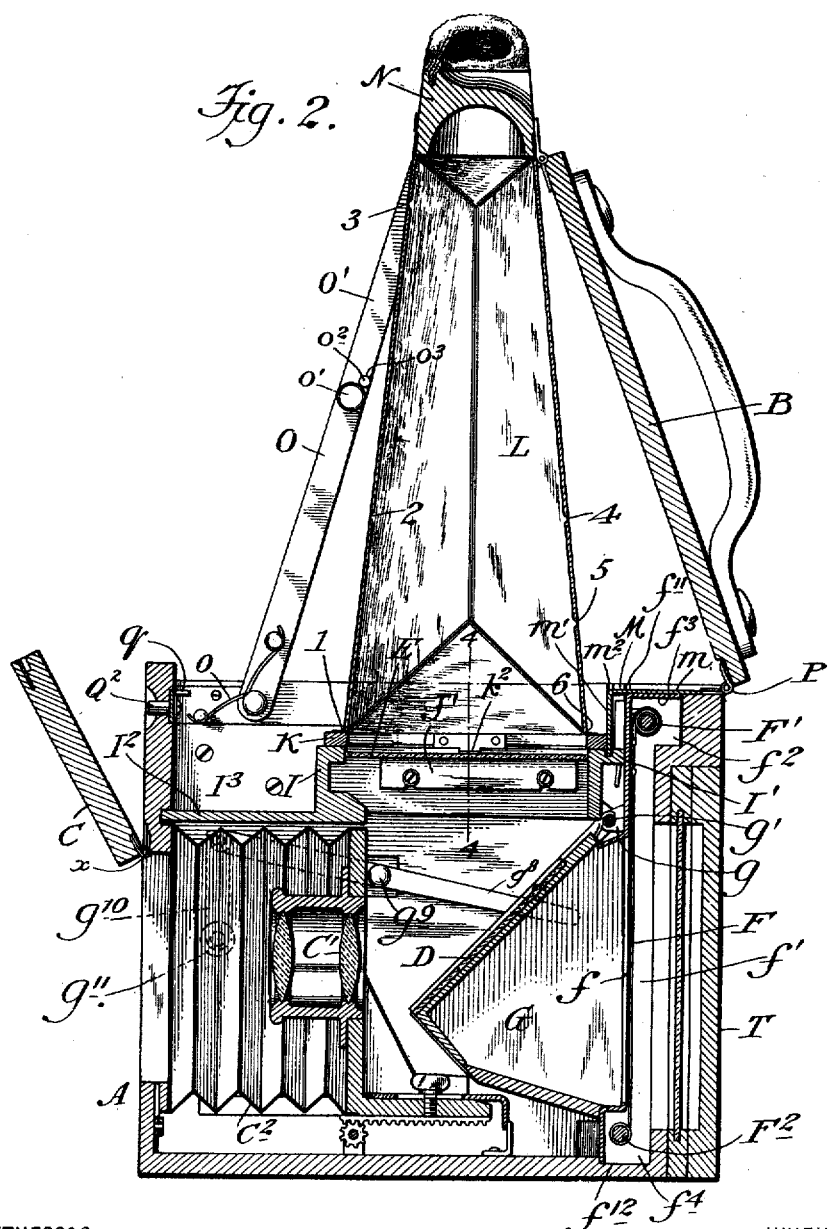
Figure 3:
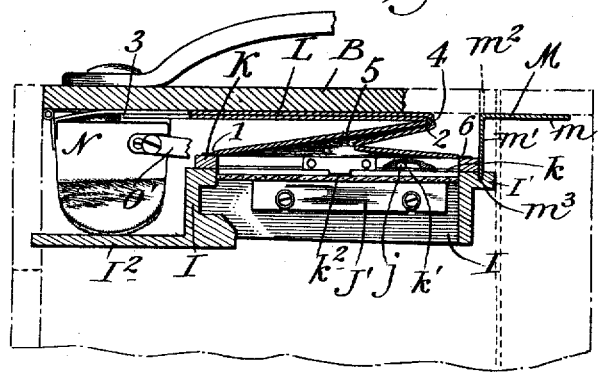
Figure 4:
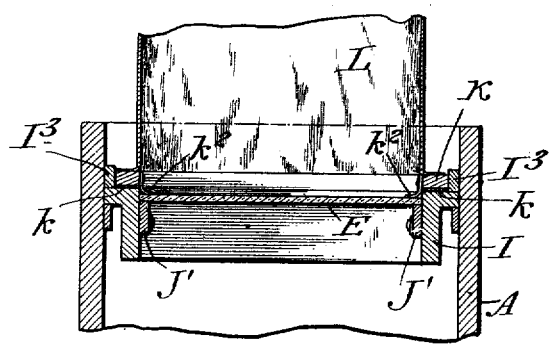
Figure 5:
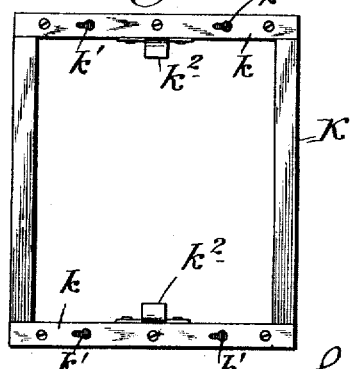
Figure 6:
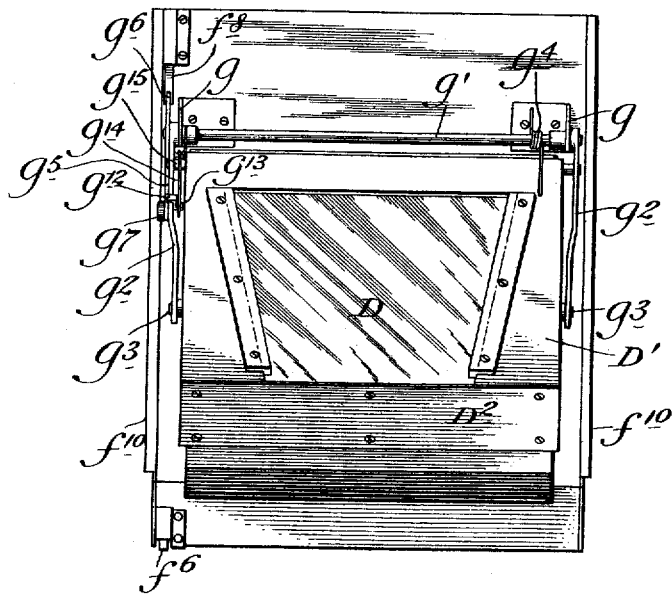
Figure 7:
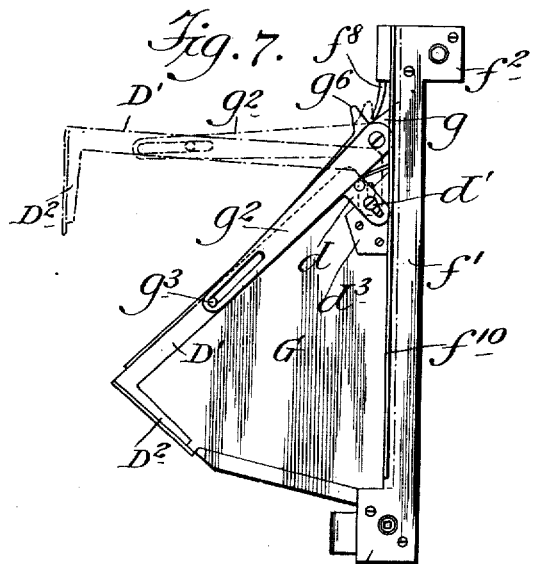

In the accompanying drawings: Figure 1, is a perspective view showing the camera box partly open; Fig. 2, a longitudinal central view with the cover and observation hood entirely raised; Fig. 3, a partial section showing the cover closed and the hood folded within the top of the camera box; Fig. 4, a detail section on the line 4, 4, of Fig. 2 showing the observation hood raised; Fig. 5, a plan of the underside of the rectangular frame to which the lower edges of the observation hood are attached; Fig. 6, a detail elevation looking at the front of the mirror; Fig. 7, a side elevation of the parts shown in Fig. 6; Fig. 8, a similar elevation taken from the opposite side and partly in section; Fig. 9, a detail elevation showing the latch devices for securing the top door of the box and the front or lens door; Fig. 10, a detail sectional view on line 10, 10 of Fig. 1; and Fig. 11, a detail section on line 11, 11, of Fig. 1.

A is the camera box provided with a cover B and a lens door C. As usual, the lens C' is mounted upon the lens board at the inner end of a collapsible bellows $C^2$ and is adjustable back and forth by means of a rack and pinion operated by a thumb piece $C^3$. Back of the lens, disposed at an angle of forty-five degrees, is a reflecting mirror D; and in the top of the box is the usual focusing ground glass E.

F is the focal plane shutter of which F' is the upper or tripping roll and $F^2$ the spring drum or tension roll.

The shutter frame having exposure opening $f$, is shown as formed of sheet metal. The side plates $f'$, at the top, project rearwardly as at $f^2$, the projections being bridged or closed at the top by the rearwardly extending part $f^3$ of the flat frame plate thereby forming an open chamber occupied by the upper shutter roll F'. At the bottom, the side plates project forward as at $f^4$ thereby forming an opposite chamber for reception of the lower or spring drum roll $F^2$. The shaft of the lower shutter roll has attached to it a toothed ring or wheel $f^5$ (Fig. 8) engaged by a spring controlled latch $f^6$ adapted to be tripped when the parts are assembled in the camera box. The upper shutter roll is provided with the usual ratchet $f^7$, and tripping pawl $f^8$ the downwardly extending arm or tail of which is acted upon by a leaf spring $f^9$ and may be actuated to trip the shutter as presently described.

Around the exposure opening at the front of the shutter frame is the ordinary light-excluding box G, the open front of which, disposed at an angle of forty-five degrees, is closed light-tight, by the flat mirror frame D' in which is mounted the mirror D. This frame is, as usual, formed at the front with a rearwardly extending flange $D^2$ overlapping at the bottom the edge of the light excluding box (Fig. 7).

A feature of this invention is the reduction of the distance between the focal plane shutter and the objective or lens when the latter is in its rearward position, thus reducing the total length of the camera-box. This is accomplished by providing the side plates of the mirror frame with rearwardly projecting right-angle extensions $d$ provided with slots embracing pivot bolts $d'$ mounted upon brackets $d^3$, forming part of the shutter frame, located at the upper sides of the exposure opening and screwed to the sides of the light excluding box G. Above these pivot bolts, and having bearings in brackets $g$, $g$, on the front face of the shutter frame, is a rock shaft $g'$ to the ends of which are attached arms $g^2$ extending along the sides of the mirror frame and having, near their ends, elongated slots in which work pins $g^3$ projecting from the sides of the mirror frame. A spring $g^4$ applied around the rock shaft $g'$ bears upon the mirror frame and tends normally to keep it closed upon its seat on the light excluding box to prevent vibration or chattering of the frame in handling the camera.

The operation of the hinge devices of the mirror frame is indicated by dotted lines in Fig. 7. As the frame is swung upwardly it pivots upon the bolts $d'$ and in the final upward movement, when the mirror closes against the ground glass box or frame I, the mirror rises bodily, the bolts $d$ then coming in the lower ends of the slots. This arrangement and the pivoting of the mirror at $d'$ in rear of the plane thereof, when in normal position, while retaining all the advantages of this type of camera, makes possible a reduction in the longitudinal dimension of the box because the front edge of the mirror frame moves rearwardly as it swings upwardly to horizontal position. The end of the rock shaft $g'$, adjacent the tripping pawl $f^8$, has secured to it an arm $g^5$ having an upward projection $g^6$ adapted to strike the tail of the tripping pawl when the mirror frame is raised (Figs. 6, 7 and 8). On the outer face of this arm, near its forward end, is a roller $g^7$ against which works the mirror raising and shutter tripping lever $g^8$ (Figs. 2 and 8) pivoted on the inner side of the camera box at $g^9$ and having (Fig. 2) applied to its front end a slide $g^{10}$ carrying a headed pin $g^{11}$ projecting through a slot in the camera box. The arm $g^5$ (Figs. 6 and 8) is provided with a bent-over extension $g^{12}$ that straddles the link or lever $g^2$ and is at its inner end turned inwardly as at $g^{13}$, and terminates adjacent the edge of the mirror frame. A wire spring $g^{14}$, turned about a pin $g^{15}$ on the inner face of the link $g^2$ has one end pressing against the bearing of shaft $g'$ and the other, or free end, upon the flange or projection $g^{13}$. When, therefore, the inner end of the tripping lever $g^8$ (Fig. 8) is thrown upwardly against the roller on the lever $g^5$ that roller rides upon it, and the tension of the spring $g^{14}$ is such that the mirror frame is carried up: and, in the final movement of these parts, the projection $g^6$ trips the focal plane shutter, as is well understood. All the parts described and illustrated, except lever $g^8$ and pivot pin $g^9$ in Figs. 6, 7 and 8, may be assembled independently of the camera box and dropped into position therein. For this latter purpose, the side plates of the shutter frame are formed with flanges $f^{10}$ that fit in vertical grooves $f^{11}$ in the inner faces of the side walls of the camera box. At the bottom, the shutter frame seats as at $f^{12}$ Fig. 2 in a recess in the bottom plate of the box; and, at the top, the upper wall $f^3$ of the frame fits closely against the back board of the camera. When the shutter frame is so dropped or placed in position in the camera box, the tripping arm $g^5$ with its roll are in proper position to be operated upon by the tripping lever $g^8$. The tripping pawl $f^6$ of the lower or spring roll of the shutter is then brought into contact with the push pin $f^{13}$ having a head seated in a recess in the bottom of the camera box and pressure upon which throws the pawl out of engagement with wheel $f^5$ to entirely relieve the shutter from the spring strain of the spring roll. When the shutter frame is in position in the box, the shafts of the upper and lower rolls register with apertures in the sides of the box.

The upper roll F' is shown in Fig. 10. The spindle H has, as usual, sliding connection with the roll, and is fitted in a cup H' seated in an aperture in the side wall to which it is attached by screws. The spindle is provided with the usual head or thumb piece and with a flange $H^2$ that bears against the bottom of the outer face of the cup, inside of which there is, loose on the spindle, a washer $H^3$ seated in a recess in the side plate of the shutter frame. The flange $H^2$ and washer $H^3$ coöperate to exclude light at all times from passing into the box around the spindle. The shaft of the lower roll $F^2$ (Fig. 11) is engaged by the spindle $h$ of the crank $h'$. The hub $h^2$ of the crank closes, on the outside, the opening through the metal cup $h^3$, closed on the inside by a flange $h^4$ fast on the spindle of the crank and seated in a recess in the side plate of the shutter frame. The hub $h^2$ and flange $h^4$ coöperate to exclude passage of light around the crank spindle.

The ground glass box or frame I is formed at the rear with a flange I' resting upon supports on the side walls of the camera box and, at the front, with a plate $I^2$ seating in a groove in the front wall of the camera box. When inserted in this position, light is excluded at the front edge of the flange $I^2$ and is also excluded along the sides of the box by side strips $I^3$ fitting down upon the extension $I^2$ and having reduced parts extending rearwardly along the sides of the box I. These strips may be secured by screws entering the side walls of the camera box, as shown in Fig. 2, and they serve also to hold the ground glass box firmly in position. The ground glass E may be laid loosely in the top opening of the box I upon supporting cleats or side strips J' (Figs. 2 and 3). Opposite upper side faces of the ground glass box have projecting headed pins $j$ serving to lock to the top of the ground glass box the rectangular frame K to which the lower edges of the collapsible observation hood L are attached, light tight. The under face of the frame K is, at the sides, provided with metal strips $k$ having key-hole slots $k'$ into the large ends of which the posts $j$ enter when, by slight lateral movement, the frame K is slid into correct position and is positively locked, with a light tight joint, upon the top of the ground glass box. Leaf springs $k^2$ attached to the inner faces of the sides of frame K serve to clamp the ground glass in its seat in the top of the frame or box I. To guard against entrance of light at the rear of the ground glass box, an angle plate M is employed. Its horizontal part $m$ overlies the top of the shutter frame and part of the upper edge of the rear wall of the camera box. Its vertical part m' slides, at its sides, in vertical grooves m² in opposite walls of the camera box and its lower edge seats in a groove m³ in the upper face of the rear part of the ground glass box (Figs. 2 and 3). The collapsible observation hood has attached to its outer end a rigid eye piece frame N, hinged at its rear edge to the cover B. The hood folds transversely on the lines 1, 2, 3, at the front, and, on the lines 4, 5 and 6, at the back. Rocking arms, O, O, pivoted within the camera box toward the front thereof, have applied to them springs o whose reaction tends to throw the arms to the front or away from the bellows. Pivotally connected with the ends of these arms are links O' the opposite ends of which are pivoted to the sides of the eye piece frame near its front edge. Adjacent the joints o' between the arms O and links O', the arms are provided with a lateral pin o² and the links with notches o³ serving to hold the arms and links rigidly when they are in alinement and the hood completely raised as in Fig. 2, in which position the reaction of the spring controlled arms and links lift the front edge of the eye piece frame to maintain the latter in horizontal position. A spring P applied to the axis of the cover serves to automatically raise the cover, hood and eye piece frame into operative position shown in Fig. 2 when the catch of the cover is released or tripped. To fold the hood and close the door, the joints o', are pressed rearwardly, and then a downward pressure upon the hood will cause a partial folding of the hood and throw the link connections O, O' into the positions shown in Fig. 1. Downward pressure upon the arms O O will now cause the links to draw down the eye piece frame so that its bottom lies against the inner face of the cover or door, the hood folding under it on the line 3. The same result may be obtained by pressing down the eye piece frame. When the door is closed as in Fig. 3, the folded hood will occupy the space above the ground glass, while the eye piece frame will occupy the deeper space at the front of the ground glass box, the bottom of which space is formed by the extension I². The operation of this part of the camera may therefore be as follows: When the catch of the door is tripped the reaction of spring P throws the door to its uppermost position, while the reaction of springs o, o throw the points of the eye piece frame supporting links forwardly, the parts assuming the position shown in Fig. 2. Mere closing pressure exerted upon the door, however, will not again fold the hood and eye piece frame into proper position, but they must be handled as described.

On the under face of the door B, at the sides of the eye piece frame, are catches Q having lateral jaws. On the inner face of the front wall of the camera box is a sliding spring controlled latch plate Q' having latches q, q adapted to be snubbed and engaged by the catches Q. In the front wall at one side is mounted a vertically movable rod R normally thrown upward by a spring r and pinned at the bottom to a lever R' pivoted intermediate its ends at r' and carrying beyond its pivot a pivoted latch S between an extension of which and a lug on the lever R' is disposed a coiled spring R³ whose reaction tends to throw the latch upwardly to lock the lens door. When the cover B is closed one of the latches Q thereof bearing upon the upper end of the rod R presses it down and throws the latch S upwardly so that closing of the lens door locks it. When the sliding latch plate Q' is thrown to the left (Fig. 9) by lateral pressure upon its projecting pin Q², the cover B is released, reaction of springs P and o throw the parts into operative position as stated, and rod R rising under the influence of its spring moves latch S out of engagement with the lens door permitting the latter, under the influence of the usual spring x applied to its axis, to automatically open as in Fig. 1. By merely, therefore, operating the latch plate Q', the camera is automatically opened in full operative position for focusing a picture after which by manipulation of the lever g³, the mirror is raised and the shutter tripped.

T represents a reversible back of any appropriate construction and preferably should be such as to receive either a plate holder or film pack.

I claim—

1. In a photographic camera of the character described, the combination of a reflecting mirror placed at an angle to the axis of the lens, and hinge devices upon which the mirror swings having means for causing the front edge of the mirror to move rearwardly as it is swung from its normal reflecting position.

2. In a photographic camera of the character described, the combination of the box G located in front of the focal plane, a mirror frame with the reflecting mirror mounted therein normally closing the open front of the box, angular projections d extending rearwardly from the mirror frame, pivot bolts having sliding slot connections with such projections, pivoted slotted links g² engaging projections on the sides of the mirror frame and means for raising the mirror frame from normal position to expose the focal plane.

3. In a photographic camera of the character described, a shutter frame carrying upper and lower rolls of a focal plane shutter, a light excluding box in front of the exposure opening, a hinged mirror frame normally closing the open front of the box and means connected with said frame adapted to be engaged by a device for raising the mirror frame and to trip the shutter, combined with a camera box formed interiorly for removably receiving and holding said parts after they have been completely assembled.

4. In a photographic camera of the character described, the combination with the cover, a collapsible observation hood equipped with an eye piece, jointed spring controlled arms and links acting to hold the eye pieces in operative position and a spring operating on the unlatching of the cover to automatically raise the cover, hood, eye pieces and links and arms into operative position.

5. In a photographic camera of the character described, the combination with the cover, a collapsible observation hood equipped with an eye piece, jointed spring controlled arms and links acting to hold the eye pieces in operative position and a spring operating on the unlatching of the cover to automatically raise the cover and hood into operative position, a door covering the lens opening, a spring tending to throw it open and latch devices automatically acting on the unlatching of the cover to release the lens door to permit it to be thrown open by its spring.

6. In a camera of the character described, the combination of the ground glass frame, the cover, a collapsible hood attached thereto, an eye piece frame attached to the outer end of the hood and hinged at its rear edge to the cover, and spring controlled jointed link connections between the front part of the eye piece frame and the camera box whereby in operative position, the spring controlled connections are adapted to act to hold the eye piece frame in horizontal position, and when the camera cover is closed, to permit the eye piece frame to fold downwardly against the inner face of the cover, substantially as described.

7. In a photographic camera of the character described, the combination of the camera box and cover, a ground glass frame constituting a horizontal partition across the upper part of the camera box below the top thereof and forming a depressed chamber in the top of the box between the front wall thereof and the ground glass, a collapsible observation hood attached around the opening in the ground glass frame, an eye-piece frame hinged at its rear edge to the cover and means for sustaining it in horizontal position when the camera is open for taking a picture and permitting it to fold downwardly against the inner face of the cover whereby when the observation hood is folded and the cover closed, the eye-piece frame occupies the depressed chamber between the front edge of the ground glass and the front wall of the camera box.

8. In a photographic camera of the character described, the combination with the camera box containing a horizontally disposed ground glass frame, of a ground glass fitted in the opening thereof, an observation hood, a frame to which the inner end of the hood is attached and headed bolt and slot connecting devices serving to lock the hood frame to the ground glass frame.

9. In a photographic camera of the character described, the combination with the camera box containing a horizontally disposed ground glass frame, of a ground glass fitted in the opening thereof, an observation hood, a frame to which the inner end of the hood is attached, headed bolt and slot connecting devices serving to lock the hood frame to the ground glass frame and springs attached to the hood frame and serving to clamp the ground glass in its seat in its frame.

10. In a photographic camera of the character described, the combination of a focal plane shutter frame carrying a light excluding box in front of the exposure opening, a hinged mirror frame normally closing the open front of the box and vertical flanges on the sides of the frame combined with the camera box having interior vertical grooves in opposite walls to receive and guide into position the shutter frame and parts assembled therewith.

11. In a photographic camera of the character described, the combination with a camera box, of the shutter frame and parts assembled therewith removably seated in the rear of the camera box, a ground glass frame having a front flange engaging a groove in the front wall of the box and at the back having a transverse groove in its upper face, and a right angle light excluding member whose horizontal part fits over the shutter frame and whose vertical part fits into said groove in the ground glass frame.

12. In a photographic camera of the character described, the combination of the camera box, its hinged cover, a door closing the lens opening, an observation hood attached to the edge of the cover and means whereby when the cover is raised, to bring the observation hood into operative position, the lens door is automatically unlatched and opened.

13. In a photographic camera of the character described, the combination with the camera box containing a horizontally disposed ground glass frame, of an observation hood, a frame to which the inner end of the hood is attached, and a sliding interlocking connection detachably connecting the hood frame and ground glass frame.

In testimony whereof, I have hereunto subscribed my name.

LOUIS BORSUM.

Witnesses:
L. F. BROWNING,
E. F. WICKS.